3,030,370
PARTICLE SIZE REDUCTION OF QUINACRIDONE AND PHTHALOCYANINE PIGMENTS

Julius Jackson, Westfield, N.J., assignor to E. I. du Pont de Nemours and Company, Wilmington, Del., a corporation of Delaware
No Drawing. Filed Aug. 24, 1959, Ser. No. 835,440
14 Claims. (Cl. 260—279)

This invention relates to the preparation of phthalocyanine pigments, and especially copper phthalocyanine in the beta crystal phase. It also relates to the production of quinacridone pigments.

The existence of at least two crystal phases in phthalocyanine pigments which are substantially free from halogen substituents, such as copper phthalocyanine, has long been recognized. There has been some confusion in the nomenclature of these phases, but the method of nomenclature used in this specification is that found in FIAT Report 1313 and in U.S. Patent 2,556,726. In these publications, the relatively reddish copper phthalocyanine blue obtained by acid pasting or salt milling is known as the alpha phase, and the relatively greenish shade of copper phthalocyanine blue obtained in the past by grinding in acetone or by milling with salt in the presence of a crystallizing solvent is known as the beta form. In general, this greenish beta phase copper phthalocyanine has shown significantly less tinctorial strength than the better forms of the alpha phase, but the beta phase has the advantage of stability to crystal growth in the presence of crystallizing solvents.

The prior art processes for the preparation of the beta phase of copper phthalocyanine, as well as the beta phase of metal-free phthalocyanine and other metal phthalocyanines, have generally involved a process for particle size reduction combined with exposure to a solvent which promotes the phase conversion. The Graham patents, U.S. 2,556,728 and 2,556,730, are illustrative of a process in which the particle size reduction is brought about by salt milling, and the phase conversion is brought about by the presence of a small amount of certain crystallizing solvents, such as aromatic hydrocarbons or certain chlorinated hydrocarbons. If the solvent were absent, the salt milling would invariably give the alpha phase product; but when such a solvent is present in sufficient quantity, the product is in the beta crystal phase.

The greenness of the beta phase copper phthalocyanine has been attractive as a potential blue pigment in the multicolor or process printing field. However, a somewhat greener pigment has been desirable. Furthermore, the strength of the prior art phthalocyanines has not been sufficient to balance the higher cost as compared with the fugitive Peacock Blues previously used in this field. On the other hand, the stability to crystallizing solvents has offered significant advantages in certain types of paint and coating compositions.

It is an object of this invention to provide a new and improved process for the production of copper phthalocyanine and other phthalocyanine pigments having improved pigment characteristics of a beta crystal phase product. It is a further object of this invention to provide a process which produces said pigment product at a substantial saving in time and manufacturing cost.

The process of this invention is also applicable to quinacridone pigments. Therefore, it is a still further object of this invention to provide an improved process for reducing the particle size of quinacridone pigments. Quinacridone pigments are described in U.S. Patents Nos. 2,844,484, 2,844,485, 2,844,581, and 2,821,530. For example, it has been shown in U.S. 2,844,484 that a simple salt milling or acid pasting of unsubstituted quinacridone results in a particular phase therein defined by its X-ray pattern and called the alpha phase. It is an intense bluish red pigment. If an aromatic solvent such as xylene is introduced during the salt milling, as shown in U.S. 2,844,485, an entirely new phase with a distinctive X-ray pattern and a characteristic intense violet color results. It has been called the beta phase. Further modification of the milling process using more powerful solvents, such as dimethyl formamide, are disclosed in U.S. 2,844,581 as giving a third crystal phase known as the gamma phase which resembles the alpha phase in color but is more stable in coating compositions and, hence, a somewhat more preferred pigment. The milling process of the present invention is an improved process which makes it possible to reduce the particle size of quinacridone pigment while retaining control of the crystal phase resulting.

The objects of this invention are obtained by milling pigments selected from the group consisting of quinacridone pigments and phthalocyanine pigments capable of existing in the beta crystal phase, with aluminum sulfate having at least 7 mols of water of crystallization; said milling being conducted in the presence of a crystallizing solvent in such an amount that the mass appears dry and free flowing throughout the operation. The sulfate is subsequently extracted with an aqueous medium and the pigment is recovered. The introduction of a small amount of a surfactant during the milling step gives further improvements with respect to the quality of the resulting products and often reduces the required milling cycle.

The use of an aluminum sulfate with at least 7 mols of water of crystallization yields a new and surprising result in the phthalocyanine pigment field. Prior to this invention, it was known that anhydrous aluminum salts, such as anhydrous aluminum sulfate, enter into a chemical combination with phthalocyanines and hydrolysis thereof results in a substantially pure alpha phase product. For this reason, anhydrous aluminum sulfate cannot be used to produce a beta phase product. Such anhydrous aluminum salts may also react with quinacridones and, consequently, they cannot be used in milling processes of the type disclosed herein. On the other hand, hydrated salts are not usually recommended for salt-milling operations because of their tendency to liberate water and cause caking. Therefore, it is quite unexpected that products could be obtained which not only have the characteristics of the desired crystal phases but, at the same time, have properties generally superior to the prior art products.

In one preferred process of this invention, a crude copper phthalocyanine pigment is charged to a suitable ball mill together with a small amount of crystallizing solvent such as tetrachloroethylene and with from 6–7 parts by weight (per part of pigment) of a crystalline aluminum sulfate having at least 7 mols of water of crystallization. During the milling cycle of from 4 to 72 hours, the temperature of the charge is maintained below about 75° C., to maintain the maximum effectiveness of the hydrated aluminum sulfate. The charge is then removed from the mill and separated from the grinding balls, and the pigment is isolated by dissolving out the water soluble aluminum sulfate. The latter step may comprise extraction with a dilute acid solution followed by filtration, washing and drying. This extraction step and subsequent washing and drying will usually also remove the crystallizing solvent, but in instances where solvent removal is not complete, conventional separation means, such as steam distillation, may be used. From an economical point of view, a separate step of removing the crystallizing solvent may be preferred since it would permit easy recovery and reuse of the solvent. Products resulting from this process are stronger, greener, and more intense than prior art beta phase copper phthalocyanines, in spite of the fact that X-ray diffraction studies usually indicate the presence of significant amounts of alpha phase material. However, such alpha phase material as may be present at this point appears to be peculiarly conditioned because it is very rapidly converted to beta phase in substantially all methods of use which involve dispersion in any organic medium. This conversion is accomplished with very little evidence of any crystal growth, and it results in completely crystal-stable compositions.

In an alternative process offering some advantages in quality and reduced milling time, a small amount of a surfactant (in the order of about 5% based on the weight of the pigment) is introduced into the ball mill with the other ingredients.

The procedures described above are equally applicable to the treatment of quinacridone pigments wherein the combination of milling with hydrated aluminum sulfate, in the presence of a suitable solvent, makes it possible either to retain the crystal phase of the starting material or to bring about a desired conversion to a new crystal phase, in all cases, however, giving products of unexpected strength and intensity. As a word of explanation about the control of crystal phases, it is believed that the influence on the resulting crystal phase of grinding with alum in the presence of solvents is essentially the same with both phthalocyanines and quinacridones. In each case, grinding in the absence of solvents tends to convert the products to the least stable phases (each called the alpha phase). The introduction of a solvent alters the equilibrium but the degree of alteration is influenced by the nature and amount of solvent, the nature of the pigment, and the amount of grinding. The solvent tends to promote the formation of the more stable phases or, as a corollary, to retain the more stable phase if it is the starting material. Thus, with copper phthalocyanine, the solvents specified shift the equilibrium toward the stable beta phase in all cases. However, with quinacridone, these solvents are not sufficiently powerful to convert a less stable phase to a more stable phase, but they will retain the more stable beta or gamma phases when they are the starting materials provided the grinding is not unduly prolonged. However, as will be seen from Example IV, it is possible to obtain a phase conversion to a less stable phase by using a long grinding cycle.

The following example sets forth this invention in still more detail:

*Example I*

A ball mill with an internal diameter of about 24″ and a total capacity of about 60 gallons is charged with 1,000 lbs. of "Cyl Pebs" (cylindrical bars of iron approximately one-half inch in diameter and one inch long). 9 lbs. (1 part) of a crude chlorine-free copper phthalocyanine (obtained by the well-known phthalic anhydride urea process) is then charged to the ball mill together with about 58 lbs. (6.44 parts) of commercial aluminum sulfate $(Al_2(SO_4)_3 \cdot 15-18H_2O)$ and about 1.3 lbs. (.144 part) of tetrachloroethylene. The mill is rotated at a speed of about 40 r.p.m. (about 74% of critical speed) for 24 hours at a temperature of about 40° C., after which the mixture of pigment and aluminum sulfate is discharged from the mill through a screen which retains the "Cyl Pebs." The powder mixture is then added to and thoroughly wet with about 1,000 lbs. of a 5% solution of sulfuric acid, and the salt and soluble impurities extracted near the boiling point for about one hour. After this, the pigment is isolated by filtering, washing free of soluble salts and drying at about 60° C. When the resulting bright blue powder is tested by rubout on a Hoover muller in lithographic varnish (a well known and conventional test for the tinctorial properties of colored pigments), it is found to be approximately 30% stronger than a beta phase copper phthalocyanine obtained by following the prior art. It is also much greener in hue and markedly more intense. Examination of the powder by X-ray diffraction shows that it is predominantly in the beta phase, but there is also evidence of a significant amount (sometimes as much as 40%) of the alpha phase material.

When this product is tested by grinding into a paint or enamel vehicle which contains significant amounts of organic solvents, the tinctorial advantages are also apparent, but examination of the resulting paint by X-ray diffraction indicates that there has been a very rapid and complete conversion of all of the residual alpha phase material to the beta crystal phase. In spite of this crystal phase conversion, there is very little evidence of any crystal growth and loss of tinctorial strength. Under some conditions, this crystal phase conversion will even occur in systems not containing any significant amounts of free solvent thus emphasizing the unusual character of the product of this invention.

When this process is carried out as described above with the grinding cycle reduced to 12 hours, the resulting product shows substantially all of the advantages listed above except that the tinctorial strength advantage over the prior art is only about 20% instead of 30%.

*Example II*

The ball mill of Example I is charged with 8 lbs. of crude, chlorine-free copper phthalocyanine, 50 lbs of commercial aluminum sulfate $(Al_2(SO_4)_3 \cdot 15H_2O)$, 1.1 lbs. of tetrachloroethylene and 0.33 lb. of a surfactant comprising cetyl trimethyl ammonium chloride. The mill is rotated at 70-75% of critical speed for about 12 hours with the temperature allowed to rise to a maximum of 60-70° C. after which the mixture is discharged from the mill and extracted with hot dilute sulfuric acid as in Example I to give an intense green shade copper phthalocyanine pigment of high strength and good crystal stability. X-ray examination shows that it is predominantly in the beta crystal phase.

*Example III*

A ball mill of the size shown in Example I and similarly loaded with "Cyl Pebs" is charged with 8 lbs. of a crude quinacridone pigment in the gamma phase (obtained as shown in the first paragraph of Example II of U.S. 2,844,581 by allowing an alpha phase quinacridone to stand for some time in contact with dimethyl formamide) together with 40 lbs. of commercial aluminum sulfate $(Al_2SO_4)_3 \cdot 15-18H_2O)$, 1.3 lbs. of tetrachloroethylene, and 0.4 lb. of a surfactant comprising an amine dodecyl benzene sulfonate (Emcol P-10-59). The mill is rotated in a conventional manner at about 40 r.p.m. for about 6 hours with temperature not exceeding about 60-70° C. The mixture of pigment and aluminum sulfate is discharged from the mill through a suitable screen and thoroughly wet up in about 700 lbs. of a 5% solution of sulfuric acid. The mixture is heated to the boil and boiled for about 2 hours, filtered hot, washed free of sulfates, washed further with a dilute solution of ammonium hydroxide and finally with water until alkali-free. It is then dried at about 60° C. and pulverized to give about 7.5 lbs. of an intense red pigment of high strength comprising gamma phase quinacridone.

*Example IV*

A ball mill like that shown in Example I is charged with 8 lbs. of a crude, gamma phase quinacridone, 50 lbs. of commercial aluminum sulfate $$(Al_2(SO_4)_3 \cdot 15-18H_2O)$$

1.1 lbs. of tetrachloroethylene and 0.36 lbs. of cetyl trimethyl ammonium chloride. The mill is rotated at about 40 r.p.m. for about 12 hours with temperature of the charge not exceeding about 60-70° C. The mill is discharged and the pigment extracted as in Example III to give about 7.5 lbs. of an intense red pigment similar to that of Example III except that it is in the alpha crystal phase as a result of using a longer milling cycle than was used in Example III.

*Example V*

A crude quinacridone in the beta crystal phase may be obtained by oxidizing dihydroquinacridone (see U.S. 2,821,529) with nitrobenzene m-sodium sulfonate in a water-sodium hydroxide-methanol mixture having the ratio of about 100:30:130 and subsequently isolating as a dry product. 8 lbs. of such a crude beta phase quinacridone is charged to the ball mill of Example I together with 50 lbs. of commercial aluminum sulfate $$(Al_2(SO_4)_3 \cdot 15\text{–}18H_2O)$$

1.1 lbs. of tetrachloroethylene, and 0.4 lb. of a surfactant comprising an amine dodecyl benzene sulfonate. The charge is milled at about 70-75% of critical speed for about 6 hours at a maximum temperature of 70° C., then discharged from the mill and extracted as in Example III to give a good yield of an intense violet colored pigment of excellent strength showing the X-ray diffraction pattern of beta phase quinacridone.

*Example VI*

A ball mill like that shown in Example I is charged with 8 lbs. of a crude alpha phase quinacridone (such as that shown in Example 9 of U.S. 2,821,529), 50 lbs. of commercial aluminum sulfate $$(Al_2(SO_4)_3 \cdot 15\text{–}18H_2O)$$

1.1 lbs. of tetrachloroethylene, and 0.36 lb. of cetyl trimethyl ammonium chloride. The mill is rotated at about 40 r.p.m. for about 12 hours with the temperature of the charge not exceeding about 60° C.–70° C. The mill is then discharged and the pigment separated from the aluminum sulfate by extraction as shown in Example III to give about 7.5 lbs. of an intense red quinacridone pigment in the alpha crystal phase.

Although this invention finds important application in the particle size reduction of chlorine-free copper phthalocyanine, metal-free and other metal phthalocyanines that can exist in a beta crystal phase may be produced by the process of this invention. Therefore, this invention is applicable to the preparation of nickel phthalocyanine, zinc phthalocyanine, and the metal-free derivative in a beta crystal phase. Furthermore, the process may be used for reducing the particle size of substituted copper phthalocyanines which are not known to exist in the beta crystal phase. In the case of these latter compounds, no crystal phase conversion is involved in their particle size reduction. Likewise, it may be used in the particle size reduction of various quinacridone pigments, not only the unsubstituted quinacridone, capable of existing in three crystal phases, but also substituted quinacridones such as the various dimethyl quinacridones, dichloroquinacridones, dimethoxy quinacridones, tetrahaloquinacridones and the like, some of which appear to exist only in one crystal phase but all of which show marked advantages in the use of the new process as compared to milling with sodium chloride or acid pasting as shown in the prior art.

The method by which the crude phthalocyanine or quinacridone has been prepared is not a part of this invention. For instance, synthesis of the metal-free phthalocyanines from phthalonitrile or of metal-containing phthalocyanines from phthalonitrile and the corresponding metal powder to give unsubstituted phthalocyanine pigments might be used instead of the phthalic anhydride-urea synthesis disclosed in Example I.

Any device which applies a substantial amount of energy between the interfaces of the salt and pigment particles is suitable for the milling operation of this invention. A roller mill or an edge runner are examples of such devices. A ball mill is an effective way of carrying out this invention, and it is preferred from a practical point of view. The dimensions of the mill are not critical, the process having been successfully operated in one-quart cans and in 1,000 gallon ball mills. Various materials have been used in the mill to bring about the grinding. The example above has shown the use of "Cyl Pebs." These cylindrical bars are preferred because their oblong shape makes them less likely to pack the powder. Spherical balls are more likely to cause packing, but they may be used in the process under proper conditions. Such balls should be of relatively small diameter, say about one-half inch in diameter. Frequently, some irregular shaped objects, such as roofing nails, are added along with either the "Cyl Pebs" or the balls to help avoid caking in the mill. These expedients are thoroughly understood by those skilled in the operation of ball mills, and are not in any way critical to this specific invention. Furthermore, it should be pointed out that in this invention the term, ball milling operation, is not limited to grinding operations which use only balls for grinding. The term is intended to cover operations which use other shaped objects in the rotating container.

It is common practice in the operation of ball mills to use a charge of grinding balls, or "Cyl Pebs," which have a gross volume of approximately one-half the volume of the mill. The amount of materials to be ground should be such that they at least completely fill the voids between the balls, and they may exceed this volume by a factor of 25-50%, so that the effective grinding charge in the mill is actually about one-half to two-thirds of the volume of the mill. Again, these are factors which are well understood by those skilled in the operation of ball mills.

One of the critical features of this invention lies in the particular crystalline material used as the salt to promote the grinding of the pigment in the ball mill. The agent which has brought about the improved results of this invention is crystalline aluminum sulfate. The ordinary commercial aluminum sulfate, sometimes called "alum" in the trade, has the theoretical composition of $Al_2(SO_4)_3 \cdot 18H_2O$, but it rarely contains all of the 18 mols of water of crystallization. The usual article of commerce contains roughly 15 mols of water. Another possible hydrate contains only 7 mols of water. It is contemplated that any crystalline aluminum sulfate in the range of 7 mols to 18 mols of water of crystallization is applicable for this invention. On the other hand, anhydrous aluminum salts are completely ineffective because of their reaction with the phthalocyanine pigment to form salts which are radically different in color and which hydrolyze in the presence of water to the alpha form of phthalocyanine. In the example shown above, the amount of aluminum sulfate used is about 6.5 parts by weight per part of phthalocyanine pigment. This amount may vary between about 4 parts and 10 parts with only minor differences in the result. In the lower part of this range, there is a tendency to form more of the alpha phase, while in the higher part of the range, the process becomes unattractive from the standpoint of cost.

A wide choice of crystallizing solvents is available for this invention. In a broad aspect any anhydrous organic solvent having a boiling range which is high enough to withstand the heat of grinding without substantial volatilization and at the same time which is low enough to permit its removal by steam distillation is suitable. A practical boiling range which meets these requirements is from about 60-220° C. Examples of suitable crystallizing solvents include tetrachloroethylene, which is preferred, xylene, methyl chloroform, sym. tetrachloroethane, p-dichlorobenzene, o-dichlorobenzene, nitrobenzene, kerosene, carbon tetrachloride, trichlorobenzene and pinene. Hydrocarbons and chlorinated hydrocarbons boiling between 60-220° C. are especially suitable.

The optimum amount of solvent varies somewhat with the particular solvent used; effective amounts range between a minimumu of about 10% (0.1 part) based on the weight of the pigment and a maximum of about 40% (0.4 part) on the same basis. As the amount is decreased, there is a tendency for the conversion to the beta phase to become slower and less complete, while with larger amounts of solvent, there is a tendency to weaken the strength of the resulting pigment.

In this process it is necessary to avoid temperatures significantly above 75° C. because higher temperatures will affect the crystalline aluminum sulfate and may lead to severe caking in the mill. It is believed that two things can happen if this limit is substantially exceeded. One is a simple dehydration releasing some water vapor into the atmosphere of the mill with the possibility of condensation near the cooler walls of the mill thus resulting in severe caking of the salt in the mill. The other situation is the possibility that at temperatures in the neighborhood of 90° C., the hydrated aluminum sulfate will actually dissolve in its water of crystallization. Either conditon would be highly undesirable. With very small laboratory mills, the maintenance of a low temperature is no problem, since the area of the mill is sufficient to result in effective air cooling. With larger mills, however, it is necessary that they be jacketed and cooled by passing cold water through the jacket. This is standard practice in the operation of many ball mills and presents no unusual situation.

The milling cycle may vary over a wide range depending upon a number of factors such as the speed, the charge, and particularly the dimensions of the mill. The use of very small mills may extend the cycle to as much as 3 days whereas large plant mills may get satisfactory grinding in as little as 4 hours. For this reason, the grinding range for purposes of this invention has been set at 4–72 hours. In the mill which was used in the specific examples good results were obtained with a grinding cycle of from 12–24 hours. Too long a milling cycle can cause a progressive change back to the alpha phase. On the other hand the milling cycle may be too short resulting in lower pigment strength. It is clear that there is an optimum time of grinding for a given set of conditions, and one skilled in the art can periodically check the quality of the pigment during a particular operation and determine the length of the milling cycle which gives best results. From the practical point of view, the preferred mill cycle requires the balancing of the desired pigment strength with capacity of the mill. Thus, although a 30% strength advantage can be obtained in a 24 hour grinding cycle, a 20% strength advantage can be obtained in a 12 hour grinding cycle which means that a small sacrifice in the possible color strength results in doubling the capacity of the mill. Also, it is entirely possible to operate large plant mills on a cycle of even less than 12 hours.

In comparison with many prior art salt milling operations, it is possible to increase the pigment charge in this invention by at least 50% and to reduce the milling cycle to about half that previously used, so that the net gain in capacity of the mill may be as much as three times that of prior art salt-solvent milling operations.

The introduction of a surfactant as shown in Examples II–V results in distinct improvements in quality and reduced milling cycles without otherwise altering the real advantages of the invention. The nature of the surfactant does not appear to be critical since both non-ionic and cationic agents have been shown to be useful. Typical useful agents include quaternary ammonium salts with at least one long chain alkyl group, Sorbitol esters of long chain fatty acids, various long chain sulfonate derivatives and the like. An effective amount of surfactant for a given set of conditions can be easily determined by one skilled in the art. A preferred amount of such agent is about 5% of the weight of the pigment, but this may vary from about 2% up to 10% or more. The preferred point of addition is to the ball mill charge prior to milling.

Although the presence of the surfactant is preferred, marked advantages over the prior art are still obtained when milling with hydrated aluminum sulfate in the absence of any added surfactant.

The advantages of this invention lie in the combination of improved products and markedly increased capacity of the mill. The products show higher tinctorial strength and improved tinctorial properties, especially improved intensity. In the case of beta phase phthalocyanines, improvements in greenness are achieved without sacrificing the excellent crystal stability of the product.

This application is a continuation-in-part of my copending application Ser. No. 549,884, filed November 29, 1955.

I claim:

1. In a process for producing a phthalocyanine having the pigment characteristics of the beta crystal phase by salt milling in the presence of a crystallizing solvent a phthalocyanine capable of existing in the beta crystal phase, the improvement which comprises milling said phthalocyanine with aluminum sulfate having at least 7 mols of water of crystallization, said milling being conducted in the presence of a crystallizing solvent in an amount which permits the grinding mass to retain the characteristics of a dry powder and above 10% based on the weight of the phthalocyanine, removing the aluminum sulfate and crystallizing solvent from the pigment, and recovering a phthalocyanine having the characteristics of the beta crystal phase.

2. The process of claim 1 in which the phthalocyanine is copper phthalocyanine.

3. In a process for producing a phthalocyanine having the pigment characteristics of the beta crystal phase by salt milling in the presence of a crystallizing solvent a phthalocyanine capable of existing in the beta crystal phase, the improvement which comprises milling said phthalocyanine with aluminum sulfate having 7–18 mols of water of crystallization, said milling being conducted at temperatures below about 75° C. and in the presence of an anhydrous organic crystallizing solvent boiling between 60–220° C. in an amount which permits the grinding mass to retain the characteristics of a dry powder and above 10% based on the weight of the phthalocyanine, removing the aluminum sulfate and crystallizing solvent from the pigment, and recovering a phthalocyanine having the characteristics of the beta crystal phase.

4. In a process for producing a phthalocyanine having the pigment characteristics of the beta crystal phase by salt milling in the presence of a crystallizing solvent a phthalocyanine capable of existing in the beta crystal phase, the improvement which comprises milling 1 part by weight of said phthalocyanine with from 4–10 parts by weight of aluminum sulfate having 7–18 mols of water of crystallization, said milling being conducted at temperatures below about 75° C. and in the presence of from 0.1 to 0.4 part by weight of a crystallizing solvent, removing the aluminum sulfate and the crystallizing solvent from the pigment, and recovering a phthalocyanine having the characteristics of the beta crystal phase.

5. In a process for producing a phthalocyanine having the pigment characteristics of the beta crystal phase by salt milling in the presence of a crystallizing solvent a phthalocyanine capable of existing in the beta crystal phase, the improvement which comprises milling 1 part by weight of said phthalocyanine with from 4–10 parts by weight of aluminum sulphate having 7–18 mols of water of crystallization, said milling being conducted at temperatures below about 75° C. and in the presence of from 0.1 to 0.4 part by weight of a crystallizing solvent selected from the group consisting of nitrobenzene, hydrocarbons and chlorinated hydrocarbons boiling between 60–220° C., removing the aluminum sulfate and the crystallizing solvent from the pigment, and recovering a phthalocyanine having the characteristics of the beta crystal phase.

6. The process of claim 5 in which the phthalocyanine is copper phthalocyanine, and the crystallizing solvent is tetrachloroethylene.

7. In a process for producing a copper phthalocyanine having the characteristics of the beta crystal phase by grinding in a ball milling operation in the presence of a salt and a crystallizing solvent a phthalocyanine capable of existing in the beta crystal phase, the improvement which comprises milling 1 part by weight of said phthalocyanine with from 4–10 parts by weight of aluminum sulfate having 7–18 mols of water of crystallization, said milling being conducted at temperatures below about 75° C. for a period of from 4–72 hours and in the presence of from 0.1 to 0.4 part by weight of a crystallizing solvent selected from the group consisting of nitrobenzene, hydrocarbons and chlorinated hydrocarbons boiling between 60–220° C., removing the aluminum sulfate and the crystallizing solvent from the pigment and recovering a phthalocyanine having the characteristics of the beta crystal phase.

8. A process for producing a copper phthalocyanine pigment having the characteristics of the beta crystal phase which comprises grinding in a ball milling operation for a period ranging from 12–24 hours at temperatures below 75° C. one part by weight of copper phthalocyanine with 6.44 parts by weight of $Al_2(SO_4)_3 \cdot 15–18H_2O$, said milling being conducted in the presence of 0.144 part by weight of tetrachloroethylene, removing the aluminum sulfate and crystallizing solvent from the pigment after the completion of the grinding step, and recovering a copper phthalocyanine pigment having the characteristics of the beta crystal phase.

9. In a process for producing a pigment selected from the group consisting of phthalocyanines having the pigment characteristics of the beta crystal phase and quinacridone pigments by salt milling said pigment in the presence of a crystallizing solvent, the improvement which comprises milling said pigment with aluminum sulfate having at least 7 mols of water of crystallization, said milling being conducted in the presence of a crystallizing solvent in an amount which permits the grinding mass to retain the characteristics of a dry powder and above 10% based on the weight of the pigment, removing the aluminum sulfate and crystallizing solvent from the pigment, and recovering a pigment of reduced particle size.

10. The process of claim 9 in which the pigment is a quinacridone pigment.

11. In a process for producing a pigment selected from the group consisting of phthalocyanines having the pigment characteristics of the beta crystal phase and quinacridone pigments by salt milling said pigment in the presence of a surfactant and a crystallizing solvent, the improvement which comprises milling said pigment with aluminum sulfate having at least 7 mols of water of crystallization, said milling being conducted in the presence of a crystallizing solvent in an amount which permits the grinding mass to retain the characteristics of a dry powder and above 10% based on the weight of the pigment, removing the aluminum sulfate and crystallizing solvent from the pigment, and recovering a pigment of reduced particle size.

12. The process of claim 11 in which the pigment is copper phthalocyanine.

13. The process of claim 11 in which the pigment is unsubstituted quinacridone.

14. The process of claim 11 in which the pigment is a dichloroquinacridone.

References Cited in the file of this patent

UNITED STATES PATENTS

| | | |
|---|---|---|
| 2,645,643 | Gottlieb | July 14, 1953 |
| 2,723,981 | Tullsen | Nov. 15, 1955 |
| 2,844,484 | Reidinger et al. | July 22, 1958 |
| 2,844,485 | Struve | July 22, 1958 |